United States Patent [19]

Warner et al.

[11] Patent Number: 5,446,122
[45] Date of Patent: Aug. 29, 1995

[54] PROCESS FOR PREPARING MACROCYCLIC POLYESTERS

[75] Inventors: Gregory L. Warner, Schenectady; Daniel J. Brunelle, Burnt Hills; Paul R. Wilson, Albany, all of N.Y.

[73] Assignee: General Electric Company, Schenectady, N.Y.

[21] Appl. No.: 346,998

[22] Filed: Nov. 30, 1994

[51] Int. Cl.6 .......................................... C08G 63/82
[52] U.S. Cl. ...................... 528/279; 528/272; 528/283; 528/298; 528/308; 528/308.6; 524/390; 524/752
[58] Field of Search ............... 528/272, 279, 283, 298, 528/308, 308.6; 524/390, 752

[56] References Cited

U.S. PATENT DOCUMENTS

| 4,086,212 | 4/1978 | Bier et al. | 528/302 |
| 4,107,149 | 8/1978 | Bier et al. | 528/309 |
| 5,039,783 | 8/1991 | Brunelle et al. | 528/272 |
| 5,214,158 | 5/1993 | Brunelle et al. | 549/267 |

*Primary Examiner*—Samuel A. Acquah
*Attorney, Agent, or Firm*—Edward A. Squillante, Jr.; William H. Pittman

[57] ABSTRACT

A method for making macrocyclic polyesters comprises the steps of supplying heat and contacting bis-hydroxy-alkyl-terminated diesters or oligomers thereof with high boiling point solvents and esterification catalysts.

9 Claims, No Drawings

PROCESS FOR PREPARING MACROCYCLIC POLYESTERS

This invention was made with government support under Government Contract Number 70NANB2H1237 awarded by National Institute of Standards Technology.

FIELD OF THE INVENTION

This invention relates to a novel process for producing macrocyclic polyester oligomers. More particularly, the invention is directed to a process for producing said macrocyclic polyester oligomers by subjecting bis-hydroxyalkyl-terminated diesters or oligomers thereof to high boiling point solvents having catalysts present therein.

BACKGROUND OF THE INVENTION

Linear polyesters such as poly(alkylene terephthalates) are well known commercially available polymers. They have many valuable characteristics including strength, toughness, high gloss and solvent resistance. Linear polyesters are conventionally prepared by the reaction of a diol with a functional derivative of a dicarboxylic acid, typically a diacid halide or ester. Further, the above-described polyesters may be fabricated into articles by a number of well known techniques including injection and roto molding and extrusion.

In recent years, macrocyclic polyester oligomers have been developed and desired since they have unique properties which make them attractive as matrices for polymer composites. Such desired properties stem from the fact that macrocyclic polyester oligomers exhibit low viscosities, allowing them to impregnate a dense fibrous preform easily. Furthermore, such macrocyclic polyester oligomers melt and polymerize at temperatures well below the melting point of the resulting polymer. Thus, melt flow, polymerization and crystallization can occur isothermally and, therefore, the time and expense required to thermally cycle a tool is favorably reduced.

Previously known methods for producing macrocyclic polyester oligomers typically employ amine catalysts and corrosive acid halides such as terephthaloyl chloride. Such methods are often undesirable since they require environmentally unfriendly halides and expensive recycling steps associated with the formation of byproduct amine salts.

The instant invention, therefore, is directed to a novel process for producing macrocyclic polyester oligomers, wherein the method comprises the step of subjecting bis-hydroxyalkyl-terminated diesters or oligomers thereof to high boiling point solvents having catalysts present therein.

DESCRIPTION OF THE PRIOR ART

Processes for preparing polyesters have been disclosed in the art. In commonly assigned U.S. Pat. No. 5,039,783, macrocyclic polyester oligomers are prepared via the condensation of diols with diacid chlorides in the presence of non-sterically hindered amine catalysts.

Additionally, in commonly assigned U.S. Pat. No. 4,132,707, a method for converting linear polyesters to branched copolyesters is described. In said method, poly(alkylene terephthalate) is combined with a mixture of phenol and tetrachloroethane and a branching component in order to produce a solid particulate blend. The solid particulate blend is subsequently heated in the presence of an inert gas in order to produce the desired branched copolyester.

Still other investigators have focused on the production of polyesters. In commonly assigned U.S. patent application Ser. No. 08/181,944, a method for producing thermoplastic polyester foams is described and the method comprises the step of subjecting macrocyclic ester oligomer precursors to initiators and blowing agents.

Finally, in commonly assigned U.S. patent applications Ser. No. 08/298,706 and 07/702,577, methods are disclosed for producing linear polyesters from macrocyclic polyester oligomers with tin containing catalysts.

The instantly claimed invention is patentably distinguishable from the above-described since, among other reasons, it is directed to a novel process for producing macrocyclic polyester oligomers by subjecting bis-hydroxyalkyl-terminated diesters or oligomers thereof to high boiling point solvents having catalysts present therein.

SUMMARY OF THE INVENTION

The instant invention is directed to a novel process for producing macrocyclic polyester oligomers and a alkanediol by-products, said process comprising the steps of supplying heat and contacting:

(a) bis-hydroxyalkyl-terminated diesters or oligomers thereof;
(b) high boiling point solvents; and
(c) catalysts.

DETAILED DESCRIPTION OF THE PREFERRED EMBODIMENTS

In the instant invention, the bis-hydroxyalkyl-terminated diesters or oligomers thereof often have the formula

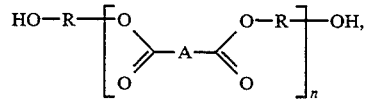

wherein A is a monocyclic or polycyclic divalent aromatic radical and preferably a 1,3- or 1,4-divalent aromatic radical when A is monocyclic and when A is a polycyclic divalent aromatic radical, it is preferably a 1,4-, 1,5- or 2,6-naphthylenic radical and each R is independently a $C_{1-10}$ alkyl group and n is an integer often from 1 to 50 and preferably from 1 to 30 and most preferably from 1 to 10.

The bis-hydroxyalkyl-terminated diesters or oligomers thereof described above are diesters or oligomers of poly(alkylene dicarboxylates) that are typically of the family consisting of polymeric glycol terephthalates or isophthalates including, for instance, poly(1,2-ethylene terephthalate) (PET), poly(1,4-butylene terephthalate) (PBT) and poly(1,2-ethylene 2,6-naphthalene dicarboxylate) (PEN) and the like. Moreover, the oligomers employed in this invention can be copolyesters of such terephthalates and isophthalates and often the copolyesters comprise less than about 25% by weight PET but preferably less than about 15% by weight PET.

There is no limitation with respect to the high boiling point solvents employed in this invention other than that they do not interfere with the cyclization reactions/esterifications of the bis-hydroxy-terminated diesters or oligomers thereof employed in this invention. "High boiling point" as used herein is defined as greater than the boiling point of the alkanediols generated in the reaction and preferably greater than about 275° C.

Illustrative examples of the solvents which may be employed in this invention include hydrocarbons such as o-, m- or p-terphenyl and the like. Halogenated hydrocarbons may also be employed; however, they are not required.

There is no limitation with respect to the catalysts employed in the instant invention other than that the catalyst is an esterification catalyst and does not decompose in the reaction. Such catalysts may often comprise tin compounds or titanium, and illustrative examples of the catalysts include organotin compounds such as those described in U.S. patent application Ser. No. 08/298,706, the disclosure of which is incorporated herein by reference and tetraalkyl titanates such as tetrabutyl titanate.

The heat supplied in the instant invention is not limited and varies with respect to the reaction environment. Typically, lower temperatures are employed when the reaction takes place in a vacuum. The only requirement is that the temperature is high enough to remove alkanediols as a by-product and it is often at about the boiling point of the alkanediols when no vacuum is employed.

The amount of catalyst typically employed in the instant invention is typically about 0.1 to about 5.0 mole percent but preferably about 0.5 to about 3.0 mole percent and most preferably from about 1.0 to 2.0 mole percent based on total moles of monomer units.

The concentration of diesters or oligomers thereof in the solvent typically employed in this invention is about 1.0 weight percent to about 10.0 weight percent and preferably from about 2.0 weight percent to about 5.0 weight percent and most preferably from about 2.0 weight percent to about 3.0 weight percent based on total grams of diesters or oligomers thereof in the solvent.

As previously stated, the instant novel process comprises the step of contacting bis-hydroxyalkyl-terminated diesters or oligomers thereof, high boiling point solvents and catalysts. The diesters or oligomers thereof are added to the solvents and the catalyst may be added to the solvents prior to, during or subsequent to the addition of the diesters or oligomers thereof since there is no limitation with respect to how the reagents are added. Once all additions have been made, a reaction mixture is obtained to which heating begins prior to, during or subsequent to all additions. Heat is supplied and the temperature is maintained in a range which allows for removal of free alkanediol.

Since the boiling points of the solvents employed in this invention are higher than those of the alkanediols generated, the alkanediols are removed and macrocyclic polyesters are generated. It is noted herein that any excess of alkanediol formed in conventional processes over the 1:1 stoichiometry found in the cyclic product interferes/prevents macrocyclic polyester formation. The instant novel process is superior since excess alkanediols are driven off/removed from the reaction by vacuum or an inert gas purge which results in an increase in macrocyclic polyester production. Additionally, in the instant invention, environmentally undesirable solvents such as o-dichlorobenzene are not required, and corrosive acid chloride reactants like terephthaloyl chloride need not be employed. The instant invention is especially superior since regulation of stoichiometric amounts of alkanediols are not required for achieving high yields since alkanediols are, again, removed as by-product in the instant invention.

The following examples further illustrate and facilitate the understanding of the above-described novel process. The products obtained may be confirmed via conventional techniques including proton and carbon 13 nuclear magnetic resonance spectroscopy, infrared spectroscopy and GPC and HPLC analysis.

EXAMPLE 1

A 2 L jacketed glass reactor was charged with 151 g (0.78 mol) of dimethyl terephthalate, 350 g (3.89 mol) of butanediol and 2.31 mL (7.8 mmol) tetraisopropyl titanate catalyst (1.0 mole percent relative to dimethyl terephthalate). The resulting mixture was heated under nitrogen to about 140° C. until a melt was achieved. The melt was subsequently heated to 190° C. under 250 torr while methanol was distilled. After approximately 2 hours, HPLC analysis indicated the formation of linear butane-diol-terminated monomer as well as dimer, trimer and tetramer thereof, 63%, 26%, 8% and 1% respectively.

EXAMPLE 2

A 25 mL flask was charged with 10 ml of m-terphenyl. To the flask was added 0.265 g (0.50 mmol) of linear dimer diol [as prepared in Example 1, and isolated from monomers, trimers and tetramers via extraction with hot water and hot methanol (75° C.)] forming a solution in m-terphenyl which was 0.10M (2.5 weight percent) in dimer diol, along with 3.5 mg of Ti(OBu)$_4$ (0.01 mmol; 2 mole percent relative to monomer units). A reaction mixture was obtained and heated to 180° C. under a nitrogen purge to remove by-product butanediol produced. Samples were removed periodically and analyzed via HPLC which indicated macrocyclic polyester formation.

EXAMPLE 3

Example 3 was prepared in a manner similar to the one described in Example 2 except that a vacuum (0.50 torr) was employed to remove by-product butanediol in lieu of a nitrogen purge. HPLC analysis indicated macrocyclic polyester formation.

EXAMPLE 4

A jacketed glass reactor was charged with 13 g of linear oligomeric diester diols, as prepared in Example 1 (25 mmol) and 342 g of moterphenyl solvent, producing a reaction mixture which was about 0.07M in concentration of monomer units (3.8 weight percent). No additional catalyst was used beyond that which was used to prepared the oligomeric diester diols. The reaction mixture was heated to 180° C. and stirred under a nitrogen purge of 50 cc/min. A vacuum of 12 torr was applied to remove free butanediol. After 24 hours, HPLC analysis indicated about 80% macrocyclic polyester formation.

What is claimed is:

1. A process for producing macrocyclic polyester oligomers and an alkanediol by-product, said process comprises the steps of supplying heat and contacting:
    (a) bis-hydroxyalkyl-terminated diesters or oligomers thereof;

(b) high boiling point solvents; and
(c) catalysts.

2. A process for producing macrocyclic polyester oligomers in accordance with claim 1 wherein said bis-hydroxyalkyl-terminated diesters or oligomers thereof have the formula

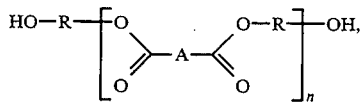

and A is a monocyclic or polycyclic divalent aromatic radical and each R is independently a $C_{1-10}$ alkyl group and n is an integer from 1 to 50.

3. A process for producing macrocyclic polyester oligomers in accordance with claim 2 wherein A is a monocyclic 1,3- or 1,4-divalent aromatic radical.

4. A process for producing macrocyclic polyester oligomers in accordance with claim 2 wherein said bis-hydroxyalkyl-terminated diesters or oligomers thereof are diesters or oligomers of of poly(1,2-ethylene terephthalate), poly(1,4-butyleneterephthalate) or poly(1,2-ethylene 2,6-naphthalene dicarboxylate).

5. A process for producing macrocyclic polyester oligomers in accordance with claim 1 wherein said high boiling point solvents have a boiling point greater than the boiling point of said alkanediol by-product.

6. A process for producing macrocyclic polyester oligomers in accordance with claim 5 wherein said solvents are o-, m-or p-terphenyl.

7. A process for producing macrocyclic polyester oligomers in accordance with claim 1 wherein said catalyst is an esterification catalyst.

8. A process for producing macrocyclic polyester oligomers in accordance with claim 7 wherein said esterification catalyst comprises tin compounds or titanate.

9. A process for producing macrocyclic polyester oligomers in accordance with claim 8 wherein said esterification catalyst is tetrabutyl titanate.

* * * * *